(12) United States Patent
Rubens et al.

(10) Patent No.: US 10,548,443 B2
(45) Date of Patent: Feb. 4, 2020

(54) METHOD AND APPARATUS FOR CLEANING A DUST STORAGE CONTAINER

(71) Applicants: Robert Bosch Tool Corporation, Broadview, IL (US); Robert Bosch GmbH, Stuttgart (DE)

(72) Inventors: Jeremy Rubens, Palatine, IL (US); Chastity Martinez, Schiller Park, IL (US)

(73) Assignees: Robert Bosch Tool Corporation, Broadview, IL (US); Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/233,257

(22) Filed: Aug. 10, 2016

(65) Prior Publication Data
US 2018/0042437 A1 Feb. 15, 2018

(51) Int. Cl.
*A47L 7/00* (2006.01)
*B01D 46/42* (2006.01)
*B01D 46/00* (2006.01)
*B01D 46/44* (2006.01)

(52) U.S. Cl.
CPC ........ *A47L 7/0095* (2013.01); *B01D 46/0057* (2013.01); *B01D 46/4272* (2013.01); *B01D 46/446* (2013.01)

(58) Field of Classification Search
None
See application file for complete search history.

(56) References Cited

U.S. PATENT DOCUMENTS

| 4,163,593 | A | | 8/1979 | Kosik | |
|---|---|---|---|---|---|
| 4,921,375 | A | * | 5/1990 | Famulari | B23Q 11/0046 144/252.1 |
| 5,950,670 | A | * | 9/1999 | Flaim | B25B 11/005 137/493.8 |
| 6,047,693 | A | * | 4/2000 | Yamami | B23D 59/006 125/13.01 |
| 6,079,078 | A | * | 6/2000 | Byington | B23Q 11/0046 144/252.1 |
| 6,851,898 | B2 | * | 2/2005 | Ege | B23Q 11/0046 408/241 S |
| 8,578,554 | B2 | * | 11/2013 | King, Jr. | B23Q 11/0046 15/339 |
| 2007/0067943 | A1 | * | 3/2007 | Makarov | A47L 7/04 15/339 |
| 2007/0157420 | A1 | * | 7/2007 | Lee | A47L 5/225 15/328 |

(Continued)

FOREIGN PATENT DOCUMENTS

DE 102010031427 A1 8/2011
EP 1806084 A2 7/2007

OTHER PUBLICATIONS

International Search Report corresponding to International Patent Application No. PCT/EP2017/070145 (4 pages).

*Primary Examiner* — Katelyn B Whatley
(74) *Attorney, Agent, or Firm* — Maginot, Moore & Beck LLP

(57) ABSTRACT

An adapter for connecting a dust storage container to a vacuum source includes a first end and a second end. The first end is configured to fluidically connect to an opening in the dust storage container. The second end is fluidically connected to the first end and is configured to connect to an operative end of the vacuum source.

5 Claims, 5 Drawing Sheets

(56) References Cited

U.S. PATENT DOCUMENTS

| | | | | |
|---|---|---|---|---|
| 2010/0170538 A1* | 7/2010 | Baker | ............... | B08B 15/04 |
| | | | | 134/18 |
| 2013/0140334 A1* | 6/2013 | Abell | ............... | B65D 25/48 |
| | | | | 222/527 |
| 2013/0255983 A1* | 10/2013 | Rubens | ............ | B23Q 11/0046 |
| | | | | 173/75 |
| 2014/0082883 A1* | 3/2014 | Tran | ............... | A47L 9/1633 |
| | | | | 15/353 |
| 2015/0245753 A1* | 9/2015 | Schuele | ............ | F16L 37/0848 |
| | | | | 285/7 |
| 2016/0114499 A1 | 4/2016 | Woloszczuk | | |

\* cited by examiner

METHOD AND APPARATUS FOR CLEANING A DUST STORAGE CONTAINER

TECHNICAL FIELD

This disclosure relates generally to dust filters, and, more particularly, to dust filters for handheld power tools.

BACKGROUND

Many types of power tool form dust when used on workpiece materials. For example, cutting into drywall, tile, wood, stone, concrete, etc. can result in dust spread not only around the cut site, but also dust dispersed into the air and spread out into a larger surrounding area. Such accumulation of dust is undesirable, especially in otherwise finished workspaces, and generally results in the need for additional cleaning and finishing of the work area.

One technique for combating the accumulation of dust is to use a vacuum system such as a shop vacuum in order to manually vacuum away dust accumulated in a work place. Such vacuuming can be manually intensive, time consuming, and difficult since dust may have dispersed through the air over a wide area.

Another technique for combating the accumulation of dust is to reduce dust formed during use of a power tool by integrating a dust collection system into the power tool itself or as an attachment to the power tool. As the power tool is used, dust is collected as it forms in order to reduce an amount of dust that accumulates in the work place or that disperses through the air. In some cases, the dust collection system includes a vacuum that sucks dust from the workpiece as it is created. In other cases, such as in the Dust Vault attachment available from Rotozip® (Product No. DM10-10) the dust collection system includes a passive fan that operates in response to the use of the power tool to collect dust as it is formed. Such dust collection systems generally include a dust collection container configured to retain dust collected by the dust collection system. FIG. 1 illustrates a perspective image of a dust canister 10 used with the Dust Vault attachment. The canister 10 includes a cavity 12 with an opening 14. The cavity 12 is configured to retain dust collected by the dust collection system which enters the canister 10 via the opening 14. The opening 14 is configured to mount the canister 10 onto a power tool. At least a portion of the cavity 12 is defined by a filter 16 which enables air entering the cavity to escape while retaining dust therein.

Once the cavity 12 is filled to capacity, or alternatively if the filter 16 becomes clogged with dust so that air can no longer escape, the canister 10 can no longer be used to collect dust. Continued use of a power tool when the canister 10 is clogged or filled is generally similar to using the power tool with no dust collection system. A filled canister 10 can be replaced with a new canister, although this requires a constant availability of new canisters for continued work, which can be expensive and wasteful. A clogged canister 10 can be cleaned by banging the filter against a hard surface in order to dislodge dust, or by attempting to blow or brush dust off from the filter. Such cleaning methods are generally imprecise, and often result in the release and spread of dust into the air which the dust collection system was intended to reduce.

Therefore a technique for collecting dust accumulated during the use of a power tool that does not require manually vacuuming the work area or constantly replacing dust canister attachments would be beneficial.

SUMMARY

In order to facilitate removing clogs from a filter in a dust storage container and clearing out a filled dust storage container, an adapter for connecting the dust storage container to a vacuum source defines a first end and a second end. The first end is configured to fluidically connect to an opening in the dust storage container. The second end is fluidically connected to the first end and is configured to connect to an operative end of the vacuum source.

In an embodiment, the first and second ends are further configured to form sealed connections with the dust storage container and the vacuum source, respectively, to enable a sealed communication between the dust storage container and the vacuum source In another embodiment, the adapter includes a valve configured to close the communication between the first end and the second end In one embodiment, the valve is configured to close the communication between the first and the second end in response to the second end not being at least one of connected to and sealed with the vacuum source.

In a further embodiment, the valve is a one way valve that operates in a direction from the first end toward the second end to prevent flow in a direction from the second end toward the first end.

In an additional embodiment, the valve includes a valve element that closes off the valve in a closed position and a valve spring that biases the valve element toward the closed position. The valve is further configured such that a vacuum force generated by the vacuum source acts on the valve element counter to the bias of the valve spring to move the valve element out from the closed position and open the valve.

In an embodiment, the adapter includes an indicator configured to display at least one of a clog condition of a filter in the dust container and a fill condition of the dust container.

In another embodiment, the adapter further includes a pressure sensor configured to sense a pressure prevailing in at least one of the dust container and the adapter. The indicator is further configured to display the at least one of the clog condition and the fill condition with reference to the pressure prevailing in the at least one of the dust container and the adapter.

An exemplary embodiment of a methodology for using an adapter according to this disclosure can be performed in order to at least one of clear a clog from a dust storage container and empty out the dust storage container. A first end of the adapter is attached to an opening in the dust storage container. A vacuum source is attached to a second end of the adapter that is in fluid communication with the first end. The vacuum source can then be operated to remove dust from the dust storage container in order to at least one of clear a clog from a dust storage container and empty out the dust storage container.

In a further embodiment, attaching the vacuum source to the second end of the adapter causes the valve to move away from the closed position In another embodiment, the methodology further includes indicating, via an indicator, at least one of a clog state of a filter in the dust storage container and a fill condition of the dust storage container.

In an embodiment, the methodology further includes sensing, via a sensor, the at least one of the clog state and the fill condition, wherein the indicating is performed with reference to the sensing of the sensor In another embodiment, the sensor is a pressure sensor configured to sense a pressure prevailing in at least one of the dust storage container and the adapter.

This summary is intended only to introduce subject matter pertaining to a bushing service tool which is discussed in more detail in the detailed description, the drawings, and the claims, and is not intended to limit the scope of this disclosure in any way.

BRIEF DESCRIPTION OF THE DRAWINGS

The foregoing aspects and other features of the present disclosure are explained in the following description, taken in connection with the accompanying drawings.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 2:
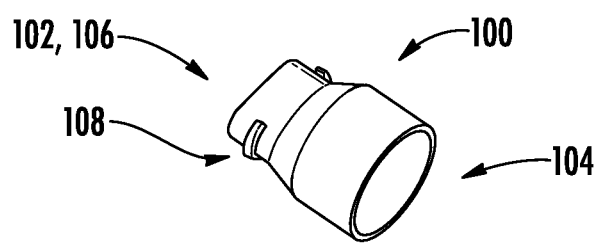
FIG. 2 is a perspective image of an exemplary embodiment of an adapter for connecting a dust storage container to a vacuum source according to this disclosure.

FIG. 2 is a perspective view of an exemplary embodiment of an adapter 100 for cleaning a dust storage container according to this disclosure. The adapter 100 defines a first end 102 and a second end 104.

The first end 102 is configured to fluidically connect with an opening in a dust storage container that enables the dust storage container to connect to a power tool. The first end 102 has a first shape 106 that corresponds with a shape 18 (FIG. 1) of the opening in the dust storage container so that the first end and the opening form a close running fit. In this embodiment, the first shape 106 is substantially elliptical, and is configured to form a close running fit with a similarly shaped an interior of the opening in the dust storage container.

In this embodiment, the first end 102 further defines a first connection ridge 108. The first connection ridge 108 is configured to interact with a connection device of the dust storage container in order to connect the first end 102 to the dust storage container. For example, the dust storage container 10 can include a clip 20 (FIG. 1) configured to clip onto the first connection ridge 108. In another embodiment, the first end 102 is configured to form a snap fit or press fit with the opening. In one embodiment, the first end 102 includes a first connection member (not shown) configured to lock the first end onto the opening. For example, the first connection member could include a hook, a spring member, or any other acceptable connection device. In one embodiment, the first connection ridge 108 is further configured to act as a sealing ridge in the presence of a vacuum provided by a vacuum source.

In some embodiments, the first end 102 includes a first sealing lip (not shown) to further seal the fluidic connection formed between the first end 102 and the dust storage container. In an example, a first sealing lip can be disposed circumferentially around the first shape 106 of the first end so as to form a first channel configured to receive the portion of the dust storage container that forms the opening in a sealing fashion. In one embodiment, at least a portion of the first end 102, such as for example the first sealing lip or an edge portion of the first shape 106, is formed from a compliant material such as a rubber material. In one embodiment, a first sealing ring (not shown), such as for example a rubber O-ring, is disposed in the channel formed between the shape 106 and the sealing lip.

Figure 1:
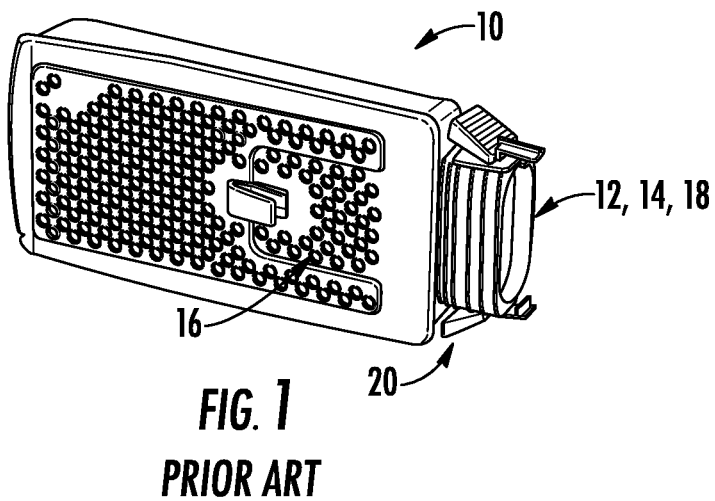
FIG. 1 is a perspective image of a known dust storage container.
Figure 3:
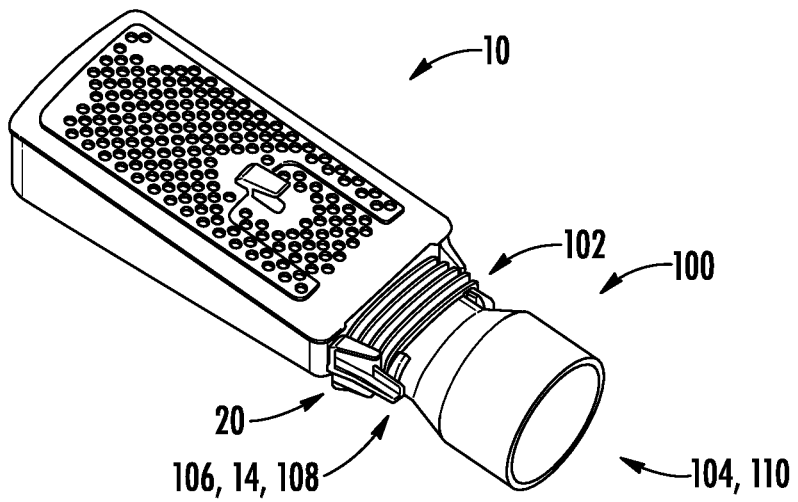
FIG. 3 is a perspective image of the adapter of FIG. 2 in use with a dust storage container.

FIG. 3 is a perspective image of the adapter 100 of FIG. 2 in use with the dust canister 10 from FIG. 1. As shown in FIG. 3, the first shape 106 of the first end 102 of the adapter 100 is inserted into the similarly shaped opening 14 in the canister 10. In this embodiment, the canister 10 includes connection clips 20 proximate to the opening 14, whereby the connecting clips 20 are engaged with the first connection ridge 108 of the first end 102 of the adapter.

The second end 104 is fluidically connected to the first end 102 via an interior 110 of the adapter 100, and is configured to fluidically connect with a vacuum source to enable fluid communication between the opening in the canister 10 and the vacuum source. To reduce an amount of dust that is released into the air and surrounding environment, the connections provided by the first end 102 and second end 104 respectively are advantageously sealed connections in order to enable a sealed fluid communication between the opening in the canister 10 and the vacuum source.

Figure 4:
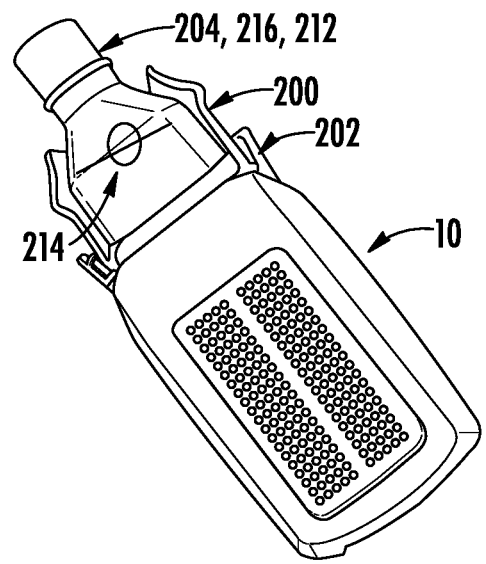
FIG. 4 is a perspective image of another exemplary embodiment of an adapter for connecting a dust storage container to a vacuum source according to this disclosure that includes a valve.

FIG. 4 is a perspective image of another exemplary embodiment of an adapter 200 in use with a canister 10. As shown in FIG. 4, the second end 204 in this embodiment includes a second connection ridge 212, and the adapter further includes a valve 214.

The second end 204 has a second shape 216 that corresponds to a similarly shaped opening in an operative end of the vacuum source so that the second end 204 and the operative end of the vacuum source form a close running fit. In this embodiment, the second shape 216 is substantially circular and is configured to form a close running fit with a similarly shaped interior of the operative end of the vacuum source. In another embodiment, the second end 204 is configured to form a snap fit or press fit with the operative end of the vacuum source. In one embodiment, the second end 204 includes a second connection member (not shown) configured to lock the operative end of the vacuum source. For example, the second connection member could include a hook, a spring member, screw threading, or any other acceptable connection device.

The second connection ridge 212 is configured to interact with the operative end of the vacuum source. For example, the second connection ridge 212 can act as a stop to delimit insertion of the second end 204 of the adapter into the operative end of the vacuum source. In one embodiment, the second connection ridge 212 is further configured to act as a sealing ridge in the presence of a vacuum provided by a vacuum source.

In some embodiments, the second end 204 includes a second sealing lip (not shown) to further seal the fluidic connection formed between the second end 204 and the operative end of the vacuum source. In an example, a second sealing lip can be disposed circumferentially around the second shape 216 of the second end 204 so as to form a second channel configured to receive the operative end of the vacuum source in a sealing fashion. In one embodiment, at least a portion of the second end 204, such as for example the second sealing lip or an edge portion of the second shape 216, is formed from a compliant material such as a rubber material. In one embodiment, a second sealing ring (not shown), such as for example a rubber O-ring, is disposed in the second channel formed between the second shape 216 and the second sealing lip.

The valve 214 is configured to close off the fluid communication between the first end 202 and the second end 204. As discussed above, when a dust storage container is removed from a power tool for cleaning, dust may escape and be dispersed in the air and around the work place. Therefore, inhibiting dust from escaping after the dust storage container has been removed from a power tool would be beneficial. In a closed position, the valve 214 prevents dust from exiting the dust storage container via the adapter 200. In an open position, the valve 214 enables dust to pass through the adapter 200 and into the vacuum source. Operation of the valve thus enables the adapter 200 to prevent the outflow of dust until the vacuum source is attached to the second end 204.

In one embodiment, the valve 214 is configured to close in response to the second end 204 not being connected to the vacuum source. In an example, the second end 204 can include an engagement member that is engaged as the second end 204 is engaged with the vacuum source, where the engagement of the engagement member causes the valve 214 to open.

Figure 5:
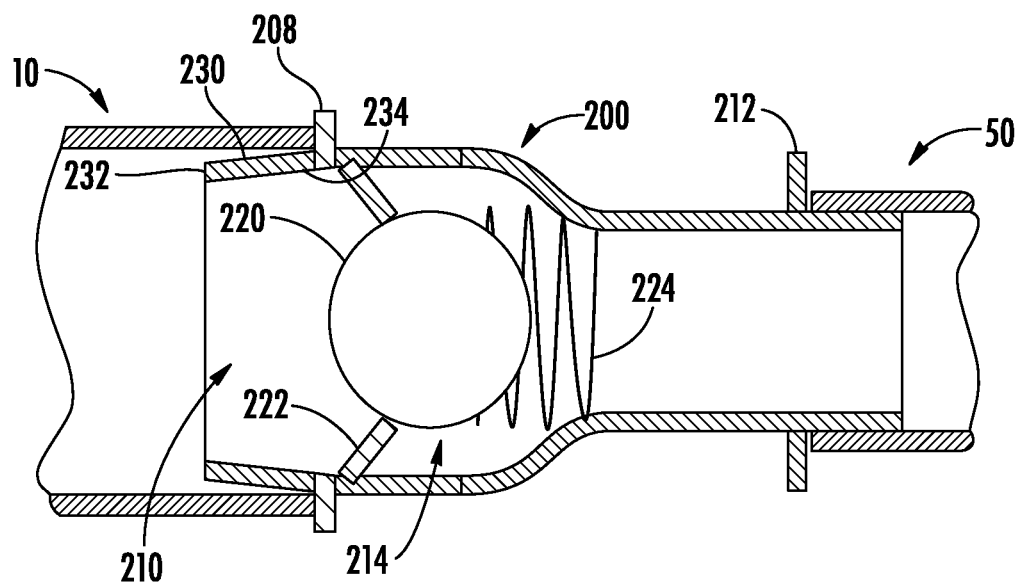
FIG. 5 is a cross section view of the adapter from FIG. 4 in use with the dust storage container and a vacuum source, where the valve is in a closed position.

FIG. 5 illustrates a cross section view of the adapter 200 in use with the dust storage device 10 and a vacuum source 50. In this embodiment, the valve 214 is a one-way valve, in particular a ball valve 214, that is configured to only enable fluid communication in a direction from the dust canister 10 toward the vacuum source 50. In FIG. 5, the valve 214 is in a closed position, and includes a valve element 220, in this embodiment a ball element 220, a valve seat 222, and a valve spring 224 disposed in the interior 210 of the adapter 200. In the closed position, the valve element 220 is engaged with the valve seat 222 and closes off fluid communication through the adapter 200. The spring 224 biases the valve element 220 toward the closed position.

As illustrated in FIG. 5, the first end 202 of the adapter 200 includes a taper 230. An end 232 of the taper 230 has a size that is smaller than the size of the opening 14 in the canister 10 in order to facilitate insertion of the first end 202 into the opening 14. A root 234 of the taper has a size slightly larger than the size of the opening 14 to facilitate a close sealed fit between the adapter 200 and the canister 10. In some embodiments, the second end 204 of the adapter 200 also includes a taper. In some embodiments, the connection ridges 208 and 212 are further configured to act as sealing ridges. In other words, in the presence of a vacuum provided by the vacuum source 50, the canister 10 and operative end of the vacuum source 50 are drawn against the connecting ridges 208 and 212 in a sealing fashion.

Figure 6:
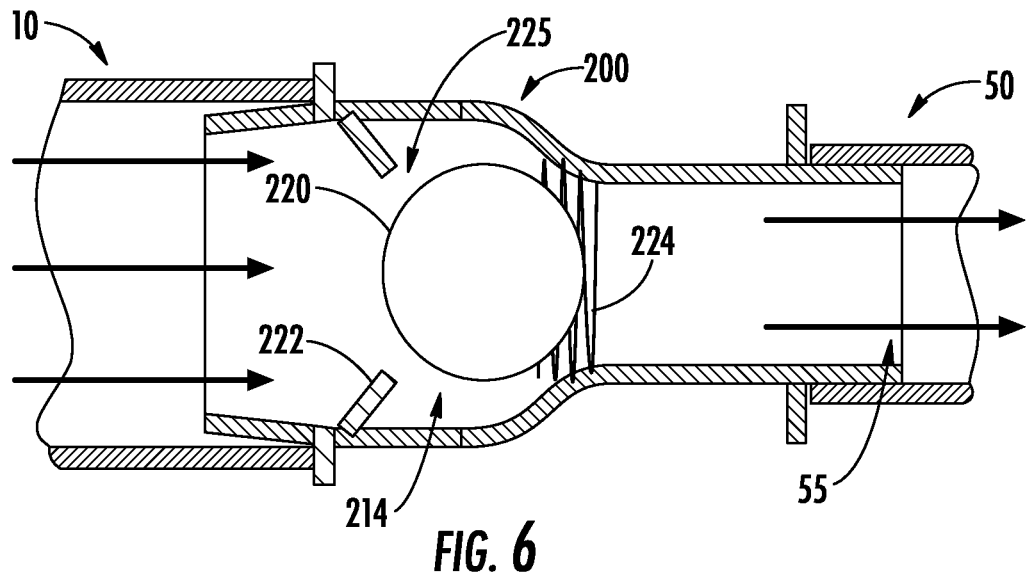
FIG. 6 is a cross section view of the adapter, dust container, and vacuum source of FIG. 5, where the valve is in an opened position.

FIG. 6 illustrates the adapter 200 in use with the canister 10 and the vacuum source 50 where the vacuum source 50 is in operation, and the valve 214 is in an open position. The valve element 220 is further configured such that a vacuum 55 produced by the vacuum source 50 exerts a vacuum force in a direction counter to the bias force of the spring 224 to move the valve element 220 away from the valve seat 222 and open the valve 214. Once the valve element 220 moves away from the valve seat 222, the valve 214 is in an open position such that dust can flow through a gap 225 between the valve element 220 and the valve seat 222.

In another embodiment (not shown) the valve 214 is configured to be manually operated, and includes, for example, a switch such as a twist valve switch or toggle valve switch disposed on an exterior of the adapter that can be selectively twisted by a user to open and close the valve. In other embodiments, other types of valves are also contemplated.

Figure 7:
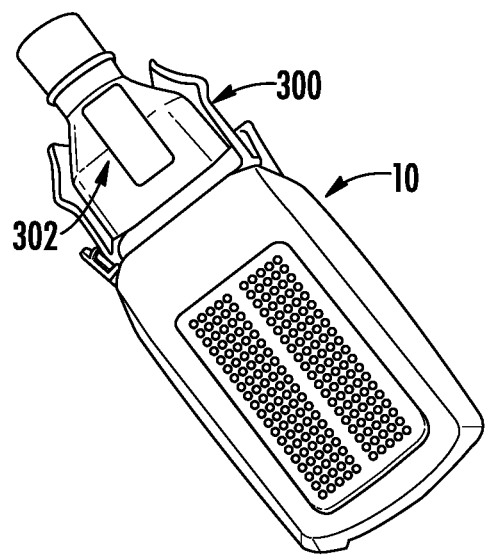
FIG. 7 is a perspective image of another exemplary embodiment of an adapter for connecting a dust storage container to a vacuum source according to this disclosure that includes an indicator.
Figure 8:
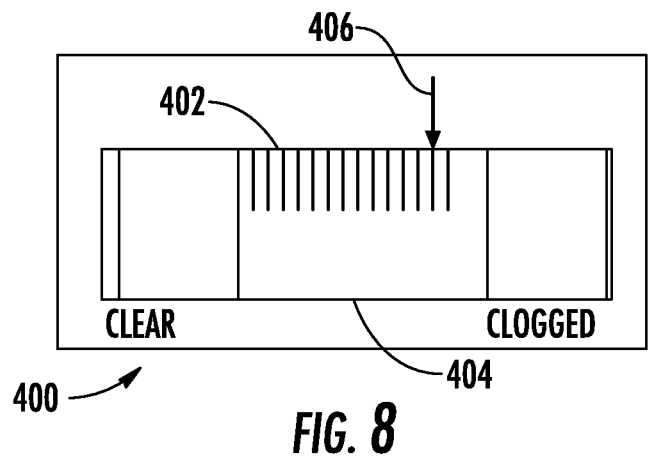
FIG. 8 illustrates an exemplary embodiment of a display for the indicator of the adapter in FIG. 7.

FIG. 7 illustrates another exemplary embodiment of an adapter 300 in use with a canister 10. The adapter 300 further includes an indicator 302 that is configured to display at least one of a clog condition of a filter 16 in the canister 10 and a fill condition of the canister 10. FIG. 8 illustrates an exemplary embodiment of a display 400 for the indicator 302 in FIG. 7. This display 400 includes a scale 402 with a legend 404 and a gauge 406. The legend 404 relates a position of the gauge 406 with the fill condition and/or clog condition of the canister 10. As the fill condition and/or clog condition of the canister 10 changes, the gauge 406 is configured to move along the scale 402 to a corresponding position. For example, as dust is removed from the filter 16 and/or interior of the canister 10, the gauge 406 moves along the scale 404 toward the label in the legend 404 marked "Clear." In this embodiment, the display 400 is substantially rectilinear, the scale 402 is a linear scale, and the gauge 406 is configured to move in response to a pressure prevailing within at least one of the adapter 300 and the canister 10. In other embodiments, other types of displays are also contemplated. For example, the display can be a dial, for example, having a rounded shape, a digital display with a numerical output, or any other acceptable type of display. In one embodiment, the display includes a light that turns on or off or that changes color or intensity in order to indicate the fill condition or clog condition of the canister. In one embodiment, the indicator 302 further includes at least one non-visual output. For example, the indicator can include an audio signal or other electronic signal.

Figure 9:
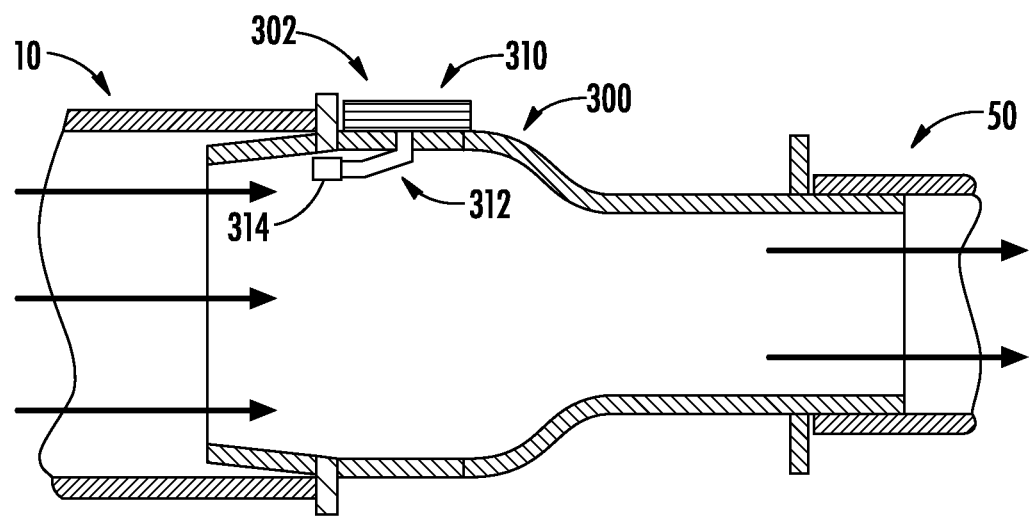
FIG. 9 is a cross section view of the adapter in FIG. 7 in use with a dust container and a vacuum source.

FIG. 9 illustrates a cross section view of the adapter 300 from FIG. 7 in use with the canister 10 and vacuum source 50. As illustrated in FIG. 9, in this embodiment, the indicator 302 includes a gauge portion 310 and a probe portion 312. The probe portion 312 includes a sensor 314 configured to sense a physical characteristic prevailing in at least one of the interior 316 of the adapter 300 and the canister 10. Physical characteristics that can be sensed include pressure, temperature, flow rate, density, etc. In this embodiment, the sensor 314 is a pressure sensor configured to sense a pressure prevailing in at least one of the adapter 300 and the canister 10.

The vacuum produced by the vacuum source 50 can be considered to have a substantially constant flow rate, even though some variance may result due to, for example, resistance, power fluctuations, leaks, and various other factors. As discussed above, the canister 10 includes a filter 16 (FIG. 3) that enables air to flow through the canister 10 while restricting dust. When the vacuum source 50 is operated, air is drawn through the filter at a pressure sufficient to meet the flow rate formed by the vacuum. In a clear condition of the filter 16/canister 10, the filter 16 is unobstructed, and air can pass through an entirety of the filter 16, resulting in a nominal pressure within the canister 10/adapter 300. When the filter 16 is partially obstructed, the vacuum pressure within the canister 10/adapter 300 rises in order to draw the same flow rate of air through the reduced area of the filter 16. In other words, as more of the filter 16 becomes unobstructed, less pressure is needed to draw in sufficient air to maintain the flow rate set by the vacuum source 50. Thus, the pressure within the canister 10/adapter 300 can be related to clog condition of the filter 16 and/or a fill condition of the canister 10.

The pressure sensor 314 is further configured to transmit a signal indicative of the pressure within the canister 10/adapter 300 to the gauge portion 310 of the indicator 302, and the gauge portion 310 is configured to output the clog condition of the filter 16 and/or a fill condition of the canister 10 with reference to the signal. In this embodiment, the gauge portion 310 is mechanical and the signal is a mechanical signal actuated via the pressure within the canister 10/adapter 300. In other embodiments, the signal can be any type of acceptable signal, such as an electronic signal.

Figure 10:
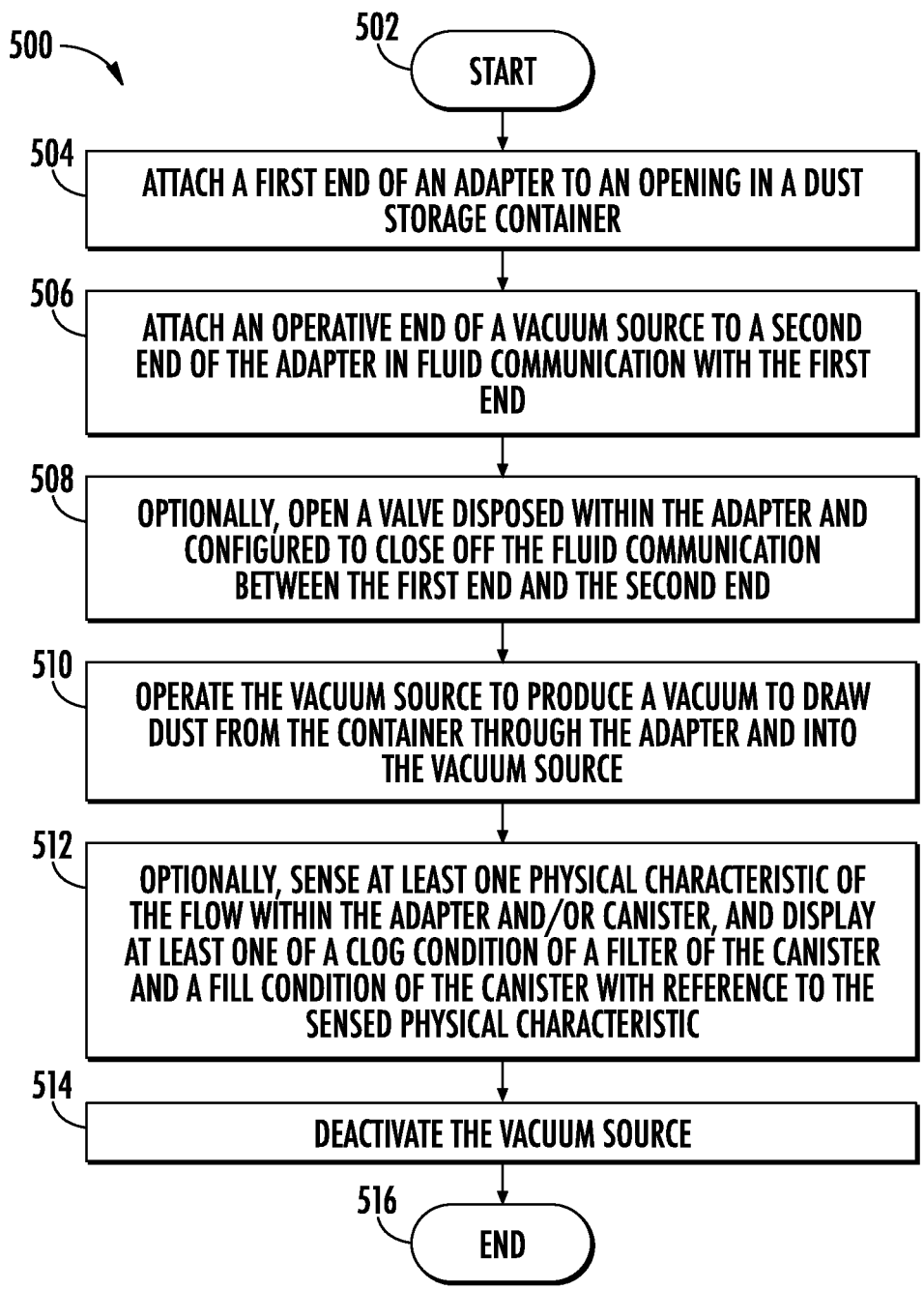
FIG. 10 is a flow diagram of an exemplary embodiment of a methodology of using an adapter to connect a dust container to a vacuum source according to this disclosure.

FIG. 10 illustrates an exemplary methodology 500 for using an adapter to clear a dust storage container according to this disclosure. The methodology begins at 502, and at 504 a first end of an adapter is attached to an opening in a dust storage container. In some embodiments, such attachment includes operating or actuating a connecting or locking member in order to lock the adapter and container together, for example, in a sealing fashion. At 506, an operative end of a vacuum source is attached to a second end of the adapter that is in fluid communication with the first end. In some embodiments, such attachment includes operating or actuating a connecting or locking member in order to lock the adapter and vacuum source together, for example, in a sealing fashion. Optionally, at 508, a valve disposed within the adapter and configured to close off the fluid communication between the first end and second end to be opened. In some embodiments, the valve is configured to open in response to the attachment of the vacuum source to the second end. In some embodiments, the valve is configured to be opened manually via a user. In some embodiments, the valve is configured to be opened in response to a vacuum produced by the vacuum source. At 510, the vacuum source is operated to produce a vacuum in order to draw dust from the container through the adapter and into the vacuum source. Optionally, at 512, at least one physical characteristic of the flow within the adapter and/or the canister is sensed by a sensor, and at least one of a fill condition of the canister and clog condition of a filter of the canister is displayed with reference to the sensed physical characteristic. In an embodiment, the physical characteristic is pressure. At 514, the vacuum source is deactivated. In some embodiments, the deactivation of the vacuum source is performed with reference to the displayed fill condition of the canister or clog condition of the filter. The methodology ends at 516.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

It is claimed:

1. A power tool and dust collection system, comprising:
a power tool that includes a dust extraction port via which dust is expelled from the power tool during operation;
a dust storage container that includes:
a tool attachment portion configured to be removably attached to the power tool, the tool attachment portion defining a container opening, the container opening being fluidly connected to the dust extraction port of the power tool when the tool attachment portion is attached to the power tool; and
a cavity fluidically connected to the container opening, and configured to receive the dust expelled via the dust extraction port and the container opening when the tool attachment portion is attached to the power tool; and
a filter that defines at least a portion of the cavity and that enables air to enter and exit the cavity; and
an adapter that includes a body having:
a first end configured to be removably attached to the tool attachment portion of the dust storage container, the first end defining a first adaptor opening that is fluidly connected to the container opening when the first end is attached to the tool attachment portion; and
a second end configured to be removably attached to an operative end of a vacuum source, the second end defining a second adaptor opening that is fluidly connected to the vacuum source when the second end is attached to the operative end;
a passage that fluidly connects the first adaptor opening to the second adaptor opening; and
a one way valve in the passage that is configured to allow dust to enter the cavity via the passage and to prevent dust from escaping the cavity via the passage when the first end of the adapter is attached to the tool attachment portion of the container.

2. The system of claim 1, wherein the first end and the second end of the adapter are further configured to form sealed connections with the dust storage container and the vacuum source, respectively, to enable a sealed communication between the dust storage container and the vacuum source.

3. The system of claim 1, wherein the adapter further includes an indicator configured to display at least one of:
a clog condition of the filter in the dust storage container; and
a fill condition of the dust storage container.

4. The system of claim 3, wherein:
the adapter further includes a pressure sensor configured to sense a pressure prevailing in at least one of the dust storage container and the adapter, and
the indicator is further configured to display the at least one of the clog condition and the fill condition with reference to the pressure prevailing in the at least one of the dust storage container and the adapter.

5. The system of claim 1, wherein:
the one way valve includes:
- a valve element configured to move between an open position and a closed position; and
- a valve spring that biases the valve element toward the closed position.

* * * * *